(12) United States Patent
Hirsch et al.

(10) Patent No.: US 11,133,723 B2
(45) Date of Patent: Sep. 28, 2021

(54) ELECTRIC MOTOR AND RADIATOR FAN

(71) Applicant: BROSE FAHRZEUGTEILE GMBH & CO. KOMMANDITGESELLSCHAFT, WUERZBURG, Wuerzburg (DE)

(72) Inventors: Daniel Hirsch, Wuerzburg (DE); Eugen Hermann, Grossheirath (DE); Reinhard Mehner, Doebeln (DE); Martin Pfister, Wiesentheid (DE); Janik Schulz, Wuerzburg (DE); Andreas Roeding, Kuernach (DE); Rainer Schoele, Leinach (DE)

(73) Assignee: BROSE FAHRZEUGTEILE GMBH & CO. KOMMANDITGESELLSCHAFT, WUERZBURG, Wuerzburg (DE)

( * ) Notice: Subject to any disclaimer, the term of this patent is extended or adjusted under 35 U.S.C. 154(b) by 25 days.

(21) Appl. No.: 16/248,340

(22) Filed: Jan. 15, 2019

(65) Prior Publication Data
US 2019/0222093 A1    Jul. 18, 2019

(30) Foreign Application Priority Data

Jan. 15, 2018 (DE) .................... 10 2018 200 598.2

(51) Int. Cl.
*H02K 5/24* (2006.01)
*H02K 3/52* (2006.01)
*H02K 1/14* (2006.01)
*H02K 7/14* (2006.01)
*F01P 5/04* (2006.01)
(Continued)

(52) U.S. Cl.
CPC .................. *H02K 5/24* (2013.01); *F01P 5/04* (2013.01); *F04D 13/0686* (2013.01); *H02K 1/146* (2013.01); *H02K 3/522* (2013.01); *H02K 7/14* (2013.01); *F01P 2005/046* (2013.01); *F16F 15/02* (2013.01); *F16F 2224/02* (2013.01)

(58) Field of Classification Search
CPC .............................. H02K 1/146; H02K 3/522
See application file for complete search history.

(56) References Cited

U.S. PATENT DOCUMENTS 4,409,502 A * 10/1983 McCabria ................ H02K 9/06
310/165
6,188,158 B1 * 2/2001 DeLuca ................. H02K 3/487
310/214

(Continued)

FOREIGN PATENT DOCUMENTS

CN  103904807 A   7/2014
EP    1215801 A2   6/2002
(Continued)

*Primary Examiner* — Quyen P Leung
*Assistant Examiner* — Minki Chang
(74) *Attorney, Agent, or Firm* — Brooks Kushman P.C.

(57) ABSTRACT

An electric motor including a rotor configured to rotate about a rotational axis and a stator extending along the rotational axis. The stator may include a stator yoke, a first tooth, and a second tooth, each provided with a shaft extending away from the stator yolk towards the rotational axis to a base. Adjacent sides of the of the first tooth and the base of the second tooth may form a groove slot. A reinforcement element may be inserted into the groove slot.

20 Claims, 7 Drawing Sheets

(51) Int. Cl.
*F04D 13/06* (2006.01)
*F16F 15/02* (2006.01)

(56) References Cited

U.S. PATENT DOCUMENTS

| | | | | |
|---|---|---|---|---|
| 6,844,653 | B2 * | 1/2005 | Kolomeitsev | H02K 1/148 |
| | | | | 310/216.082 |
| 9,614,406 | B2 | 4/2017 | Johnson et al. | |
| 2003/0098630 | A1 * | 5/2003 | Owada | H02K 3/522 |
| | | | | 310/194 |
| 2014/0175935 | A1 | 6/2014 | Tsuchiya et al. | |
| 2015/0061452 | A1 * | 3/2015 | Nakatake | H02K 3/325 |
| | | | | 310/214 |
| 2015/0076954 | A1 * | 3/2015 | Johnson | H02K 3/487 |
| | | | | 310/214 |

FOREIGN PATENT DOCUMENTS

| | | |
|---|---|---|
| FR | 2393455 A1 | 12/1978 |
| JP | S538505 U | 1/1978 |
| JP | H06233488 A | 8/1994 |
| JP | H11150893 A | 6/1999 |
| JP | 2008178211 A | 7/2008 |
| JP | 2009189145 A | 8/2009 |
| JP | 2011130566 A | 6/2011 |
| JP | 2014128108 A | 7/2014 |
| JP | 2017046369 A | 3/2017 |

* cited by examiner

ELECTRIC MOTOR AND RADIATOR FAN

CROSS-REFERENCE TO RELATED APPLICATIONS

This application claims priority to German Patent Application No. DE 10 2018 200 598.2 filed Jan. 15, 2018, the disclosure of which is incorporated in its entirety by reference herein.

TECHNICAL FIELD

The present disclosure relates to an electric motor that may be used with a radiator fan, in particular a radiator fan for a motor vehicle.

BACKGROUND

A brushless electric motor may include a rotatably mounted rotor and a stationary stator. The stator may include stator teeth that are e.g. arranged in a star-shaped manner, between which a respective stator groove is formed. A stator winding in the form of individual coils is accommodated in these stator grooves, which are particularly wound with a wire. The coils that are interconnected e.g. in a star or delta connection, are supplied with an AC current in order to produce a rotating field. The rotor furthermore comprises e.g. permanent magnets, whose magnetic field alternatingly interacts with the rotating field that was produced by the coils, so that the rotor is rotationally driven. The rotor as well as the stator may be respectively formed as a laminated core, in order to particularly prevent eddy current losses.

SUMMARY

According to one embodiment, the electric motor comprises a rotor that is mounted in such a way that it can be rotated around a rotational axis that extends in axial direction and a stator with a laminated core, which forms a stator yoke and stator teeth of the stator that are directed in radial direction from the stator yoke, wherein the stator teeth are extended in a T-shaped manner by forming pole lugs (tooth tips), which extend in circumferential direction of the stator on the side of the base of the tooth (on the side of the open end, pole shoe side). The pole lugs may form a respective contact surface or -contour, which is referred to as contact shoulder in the following.

So-called stator grooves may be formed between the stator teeth in order to accommodate the coils of a stator winding and a respective groove slot is formed between the pole lugs that are facing each other. A number of reinforcing elements are provided, which are inserted into a corresponding number of groove slots. The reinforcing elements are furthermore held at the pole lugs of neighboring stator teeth, which are facing each other in radial direction by contact shoulders that are formed from these pole lugs.

A number of reinforcing elements are understood to refer to one, two, or more reinforcing elements. For example, one respective reinforcing element may be inserted into every other groove slot. However, the number of reinforcing elements may correspond to the number of groove slots, so that one reinforcing element may be inserted into each groove slot.

A T-shaped extension is understood in that the stator teeth features a T-shaped cross section in a plane that is perpendicular to the axial direction. The stator teeth which extend from the stator yoke along the radial direction that may form the vertical T-leg (tooth shaft) of the T-shape, while the pole lugs that are oriented in circumferential direction, i.e. perpendicular to the axial and radial direction, form the horizontal T-legs (base) of the T-shape. The open-ended side of the horizontal T-leg may be arranged at the side of the stator tooth that is facing towards rotor or the groove between it and the stator. The horizontal T-legs may form a respective pole shoe.

Additionaly, the reinforcing elements may be force-fitted with the corresponding pole lugs, by press-fitting and/or adhesive bonding, e.g. a gluing or welding, such as ultrasonic welding.

Reinforcing elements may reinforce the stator. The reinforcing element(s) may exert a force in this case onto the stator teeth, in particular in circumferential direction, and thus onto the entire stator, so that any vibration of the stator is damped and/or that a natural frequency of the natural oscillation of the stator is specifically shifted, in particular increased, into a frequency range, in which an oscillation excitation is not to be expected. In summary, the acoustics of the electric motor are improved in this way and any wear that occurrs due to the oscillation is prevented.

The reinforcing elements may be inserted into the corresponding groove slots after the introduction of the coils, by so-called needle winding. In this way, it is further possible that the winding or the tool, which performs the winding, can move through the groove slots. An adjusting of the laminated core of the stator is thus particularly not necessary. It may be possible to manufacture the laminated core of the stator by existing procedures and with the (punching) tools that are used for this purpose.

In another embodiment, the laminated core may be formed by a number of individual metal sheets. Each individual sheet may include a ring-shaped yoke section along with radially oriented sheet teeth that are formed in a one-piece manner, or that are monolithically integrated, which are stretching in circumferential direction of the stator on the side of the tooth base forming sheet lugs that extend in a T-shaped manner. The stator yoke may be formed from the yoke sections of the individual sheets, the stator teeth may be made of the sheet teeth of the individual sheets and the pole lugs are formed from the sheet lugs of the individual sheets.

The stator with a laminated core that is formed from one-pieced individual sheets can be produced or manufactured with relatively little effort. For example, in the case of the so-called star-yoke design, the yoke and the stator teeth may be punched as individual components from the individual sheets and have to be subsequently joined together when they are produced. For a stator that is packed with one-pieced individual sheets, this step is not necessary, due to which the costs for the tools that are necessary for both, the procedure as well as for the manufacturing of the stator can be saved.

In accordance with another embodiment, the open-ended side of the pole lugs may feature a groove that is open in circumferential direction that may extend in axial direction with two adjacent groove walls in radial direction. One of the groove walls may form the contact shoulder for the reinforcing element in one radial direction, while the other groove wall may form the contact shoulder for the reinforcing element in the opposite radial direction.

The groove walls that are oriented in a parallel way towards each other may extend in a plane that is spanned by the circumferential direction at the point of the groove and by the axial direction. A groove floor that is connecting the two groove walls accordingly streches in a plane that is spanned by the axial and the radial direction. In other words, the groove reach into the stator tooth in circumferential direction.

In another embodiment, the stator, or only the laminated core, may feature a plastic overmolding, that may completely or partially form the contact shoulder or the groove. In the partial configuration of the groove formed by plastic overmolding, the stator yoke sided groove wall is formed of the plastic overmolding and the rotor-sided groove wall of the laminated core of the stator. For this purpose, the laminated core of the stator features e.g. a particularly L-shaped notch at the circumferencial sided ends of the pole lugs, on the side that is facing towards the yoke. The notch is may be cut out or excluded from the plastic overmolding to form the groove.

For a complete formation of the groove by plastic overmolding, both groove walls are formed by plastic overmolding. In this configuration, an adjusting of the shape of the laminated core is not necessary.

In one advantageous embodiment, the reinforcing element may be designed as a plate or platelet, i.e. as a plate- or platelet-like component. The reinforcing element is particularly rectangular in shape. In the following, the two-dimensional sides of the plate are referred to as broad sides (longitudinal side) and the sides adjacent to these are referred to as first and second narrow sides (transverse side). The broad side and correspondingly the first narrow side may include an expansion (length), which corresponds to the expansion of the groove slot in axial direction. The reinforcing element may be inserted into the groove slot in such a way, that the first narrow sides are arranged with the length of the groove slot at the pole lugs.

As far as grooves are formed within the respective pole lugs, the reinforcing element may be placed into these by way of a tongue-and-groove joint and is thus joined in a form-fit manner in radial direction. To accomplish this, a respective joining contour that is complementary to the groove is arranged on the mutually opposite narrow sides of the plate-shaped reinforcing element. Alternatively, the plate-shaped reinforcing element features an expansion (thickness) that is perpendicular to the broad side, which corresponds to the groove expansion in radial direction. At best, an advantageous press-fit dimension is allowed.

The reinforcing element is designed e.g. in several parts, in that several plate-shaped parts are provided. In this case, either their broad sides are facing each other, or alternatively, their second narrow sides are facing each other. In their assembled state, the components of the reinforcing element are thus arranged in radial direction one behind the other or in axial direction one on top of the other.

However, the reinforcing element may be designed in one piece and in a symmetrical way. For example, the reinforcing element may be designed in a mirror-symmetric manner with regards to the longitudinal axis (between the broad- or longitudinal sides) and with regards to the transverse axis (between the narrow- or transverse sides). In other words, the reinforcing element may be designed in a mirror-symmetric manner with regards to two planes, which respectively run through the perpendicular bisector of the broad side and parallel to one of two respective adjacent narrow sides. Due to the symmetry and the one-piece design, the mounting of the reinforcing element is made possible and is identical in different orientations and is therefore particularly failsafe. Therefore, a monting of the reinforcing element with a wrong orientation is conveniently avoided. The reinforcing element can thus be provided for the installation as bulk material in a cost-efficient manner.

In another embodiment, the reinforcing element may be formed from a non-magnetic material. In particular, this is understood to refer to a magnetic permeability of the material of less than 5 ($\mu_r$<5), such as, equal to 1 ($\mu_r$=1), and an electrical conductivity (sigma) of less than 40 Siemens/meter ($\sigma$<40 S·m$^{-1}$), such as, 1.4 Siemens/Meter ($\sigma$=1.4 S·m$^{-1}$).

For example, a plastic material such as polyamide (PA6 or PA66) or polybutylene terephthalate (PBT) may be used in this case. This version, which is referred to as plastic variant, may not be electrically conductive, so that no eddy current losses occur in the reinforcing element. If the reinforcing element is press-fitted, a comparatively low press-fitting force may be necessary, so production-related damage is avoided. Alternatively, the reinforcing element may be formed from a non-magnetic and corrosion-resistant stainless steel such as X5CrNi18-10. Compared to the use of magnetic materials for the reinforcing element, no magnetic flux occurs at the pole lugs, due to which advantageously, a useful power output of the motor is not reduced.

The choice of the material for the reinforcing element furthermore affects the acoustic characteristics of the stator. Thus, in particular the vibrations of the stator that occur in the plastic material variant of the reinforcing element are comparatively intensely damped. The stainless-steel version on the other hand, may increase the stiffness of the stator and an excitation of an oscillation is reduced.

In another embodiment, the reinforcing element may feature on at least one of the narrow sides on the end faces a further joining contour for a form-fitting with the respective pole lug with regards to the axial direction. Both narrow sides on the end faces feature one respective joining contour. The narrow sides on the end faces refer to those narrow sides, which are not designed to produce the joining by way of a tongue-and-groove joint with the pole lugs or that are oriented perpendicular to the axial direction in the assembled state of the reinforcing element in the electric motor.

The joining contour is may be formed at a first narrow side on the end face as a further contact shoulder, so that the reinforcing element is secured against a losening in axial direction in the direction of the first narrow side on the end face towards the other, second narrow side on the end face. In addition to this, the second narrow side on the end face e.g. features a locking or snapping hook that is protruding in perpendicular direction towards this side, which engages with a corresponding contour that is particularly arranged at the plastic material overmolding or that is shaped onto it.

The joining contour may be designed as a pin, which provides an axial rear grip with the respective pole lug in the assembled state. In one version of the reinforcing element, the pins may protrude in a perpendicular direction with regards to the corresponding narrow side on the end face in the stainless-steel version. After the reinforcing element has been inserted into the groove slot, the pins may be bent over to provide the axial rear grip in circumferential direction. In the plastic variant, the pins of the reinforcing element may be inclinded away from each other in circumferential direction on their end faces. In the course of the assembly, the pins may be elastically bent (towards each other), so that these reach behind the corresponding pole lugs of the stator tooth with at least an axially directed component when they are completely inserted.

The groove that accomodates the reinforcing element may not be continuous in axial direction. On one of its end sides with reference to the axial direction, the groove may feature a contact location for the reinforcing element. In the course of the assembly, the reinforcing element may be then inserted into the groove from the other end side. In this case, the joining contour reaches behind the contact location, so that a form-fitting connected is achieved in axial direction in a comparatively reliable manner.

As a result of the form-fitting connection, the reinforcing element may be secured against loosening.

In another embodiment, the reinforcing element may be provided with at least one respective passage opening that leads into the corresponding stator groove. The reinforcing element may feature a passage opening that is designed as a recess or a bore hole, which is continuous and perpendicular to the broad side of the reinforcing element. The reinforcing element may feature a plurality of such passage openings. The passage openings may be circular, or an elongated hole, or slot-shaped. The passage openings may improve air circulation and cooling is made possible through the reinforcing element on the one hand and a cooling is thus improved. It is furthermore possible that dirt particles or water that may have entered into the electric motor, can be discharged in a simple manner through the passage openings out of the stator groove. On the other hand, the passage openings have the function in one embodiment of the reinforcing element, which is electrically conductive, to reduce or avoid eddy current losses.

According to another embodiment, a radiator fan, in particular of a motor vehicle, may include an electric motor in one of the variants described above, which particularly drives a fan propeller in a rotational direction. The electric motor of the radiator fan may include a number of reinforcing elements which correspond to the number of stator grooves, which are held in the corresponding groove slots by the contact shoulders that are arranged on the pole lugs of the stator teeth. The groove may be formed partially or completely formed of a plastic overmolding of the stator. The acoustic characteristics of the radiator may be improved by use of the reinforcing element. As a result, an acoustics that is perceived as comparatively pleasant is thus realized during the operation of the radiator fan.

BRIEF DESCRIPTION OF THE DRAWINGS

In the following, design examples of one or more embodiments are explained in more detail by a drawing. It is shown therein.

Components that correspond to each other are identified with the same reference signs in all figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

From e.g. the WO 2010/145841 A2, an electric motor with a stator is known, which is configured with a laminated core with individual laminations that are stacked on top of each other. It features a circumferential-sided yoke and an even number of stator teeth, which protrude towards the radial inside. In circumferential direction, every second stator tooth is thereby without a coil. The stator teeth that bear a coil furthermore feature pole lugs that protrude in circumferential direction at the inner end of the tooth.

If such an electric motor is operated with a startor that features a laminated core, it is possible to excite an (natural) oscillation of the stator at certain rotation speeds. In other words, reference is made to a resonance. Disadvantageously, this is noticeable e.g. by an increased noice generation. Furthermore, due to these excited oscillations, an additional load and a thereby resulting abraison of the components that are interacting with the stator is increased.

Figure 1:
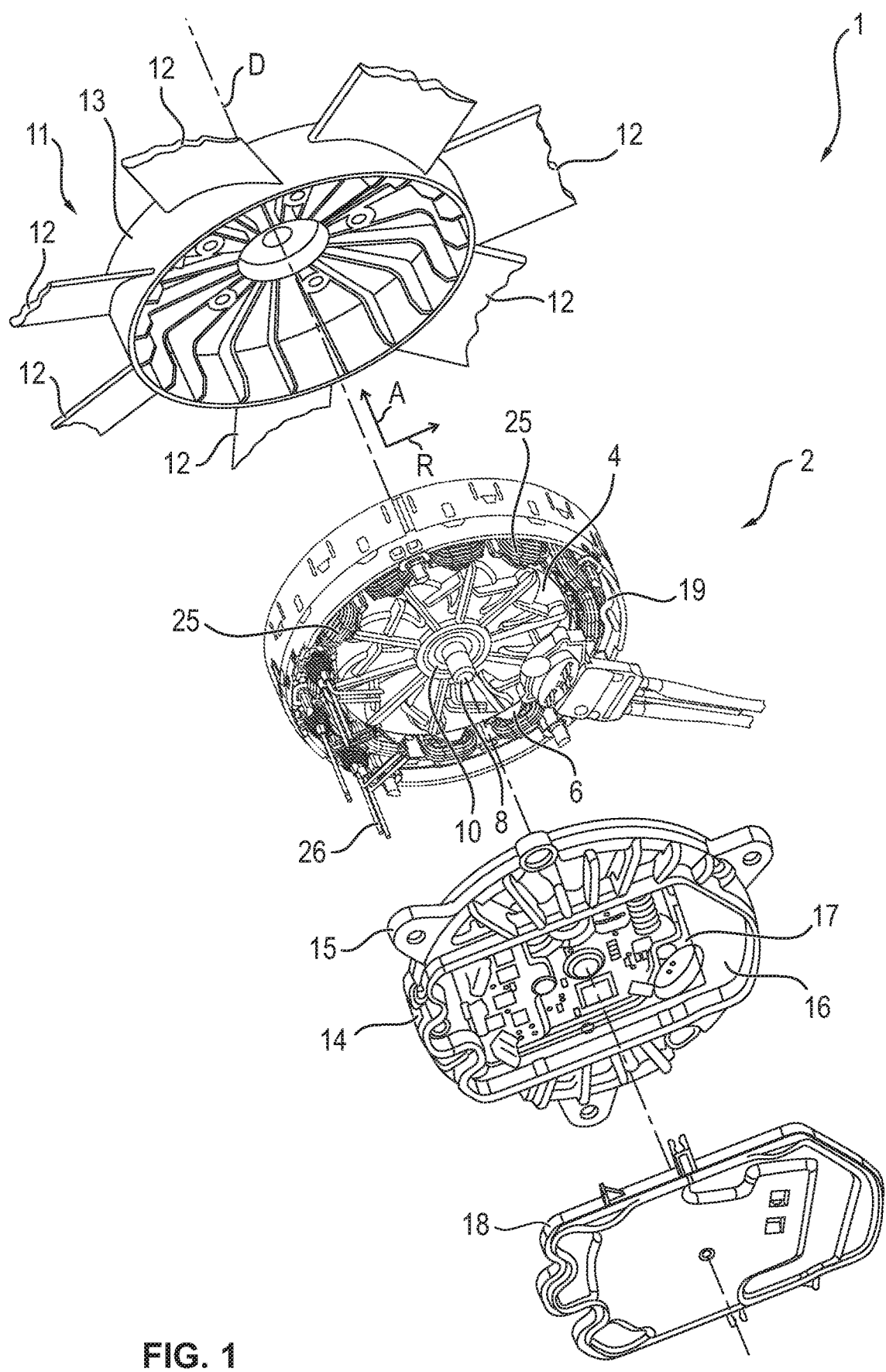
FIG. 1 shows an exploded view, a radiator fan with an electric motor, which comprises a rotor that is designed as an internal rotor and a stator, whose stator teeth extend in radial direction towards the rotor, wherein the stator teeth are extended with a formation of pole lugs on the side of their open end.

FIG. 1 shows a radiator fan 1 in an exploded view, which is intended particularly for the use in a motor vehicle that is not further depicted, comprising an electric motor 2 with a rotor 4 and a stator 6. Rotor 4 is rotationally mounted around a rotational axis D by an axis pin 8, wherein the rotational axis D extends in an axial direction A. Axis pin 8 is may be mounted by bearings 10, which are arranged on the respective end sides at axis pin 8. In the drawing, rotor 4 is configured as an internal rotor, i.e. stator 6 includes rotor 4 on the outer side with reference to a radial direction R that runs perpendicular to the axial direction A. However, the rotor 4 may be an external rotor according to one or more embodiments. In this case, the explanations that are provided in the following apply in the same way.

The rotor 4 may be set in a drive connection with radiator fan 11. On its outer circumference, the radiator fan 11 may include air guide blades 12, which are only partially depicted for the purpose of a better overview. Radiator fan 11 may include a central cap 13, that may be attached to rotor 4 of electric motor 2.

On the end face of electric motor 2 that is facing away from the radiator fan 11, a motor carrier 14 is arranged with flanges 15 for the mounting of the radiator fan. On the side that faces away from radiator fan 11, motor carrier 14 further features a case for electronic components 16 for a motor electronics 17, which is covered by an electronics compartment cover 18 in the assembled state.

Stator 6 comprises an essentially hollow-cylindrical stator yoke 19. Its stator teeth 20 protrude from it in radial direction towards rotor 4. On the side of their open end, or at the end that is facing towards rotor 4, the stator teeth are thereby extended by pole lugs 21 in a circumferential direction U with reference to the stator 6, in other words, perpendicular to the axial direction A and perpendicular to the radial direction R. Consequently, stator teeth 20 form a T-shape in a plane that is perpendicular to the axial direction A, whose horizontal T-leg is formed by the pole lugs 21.

Figure 2A:
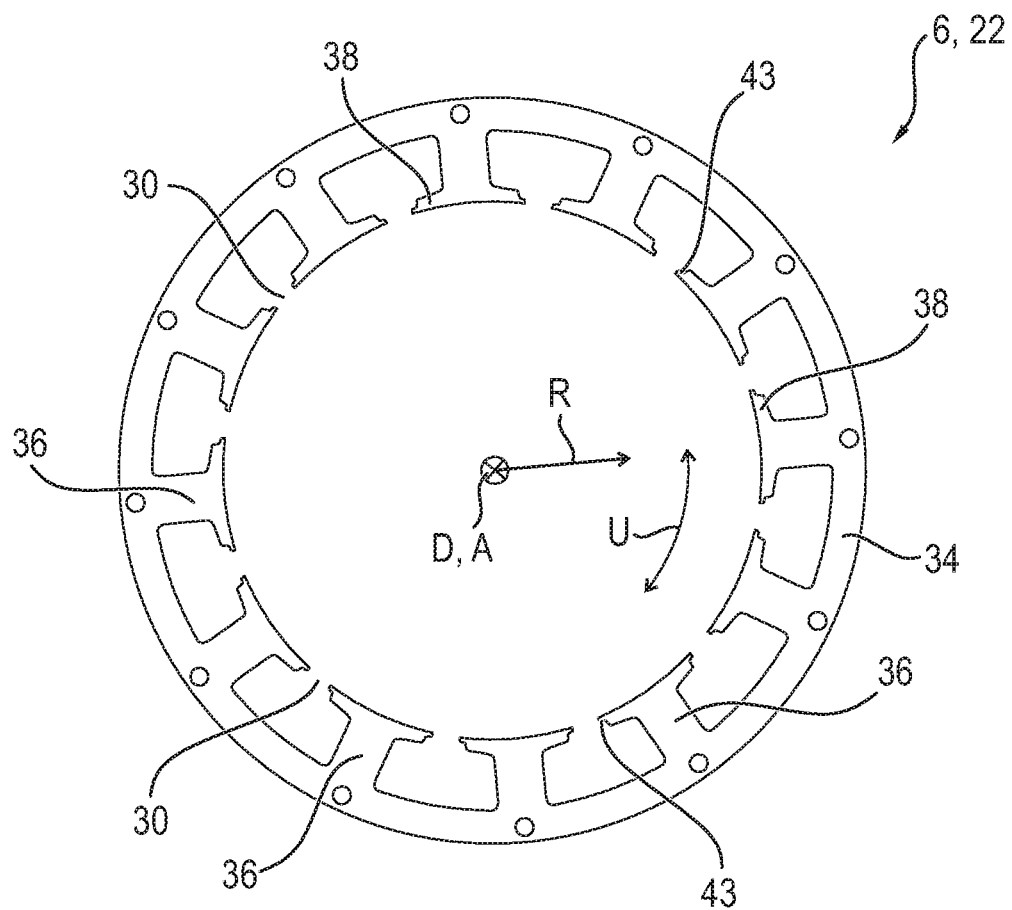
FIGS. 2a and 2b show a top view or in an enlarged excerpt in a perspective view, the laminated core of the stator, which is made up of a number of individual sheets, wherein the individual sheets feature a respective yoke section from which stator teeth, which are molded onto the yoke section, that protrude in radial direction in a monolithic manner.
Figure 2B:
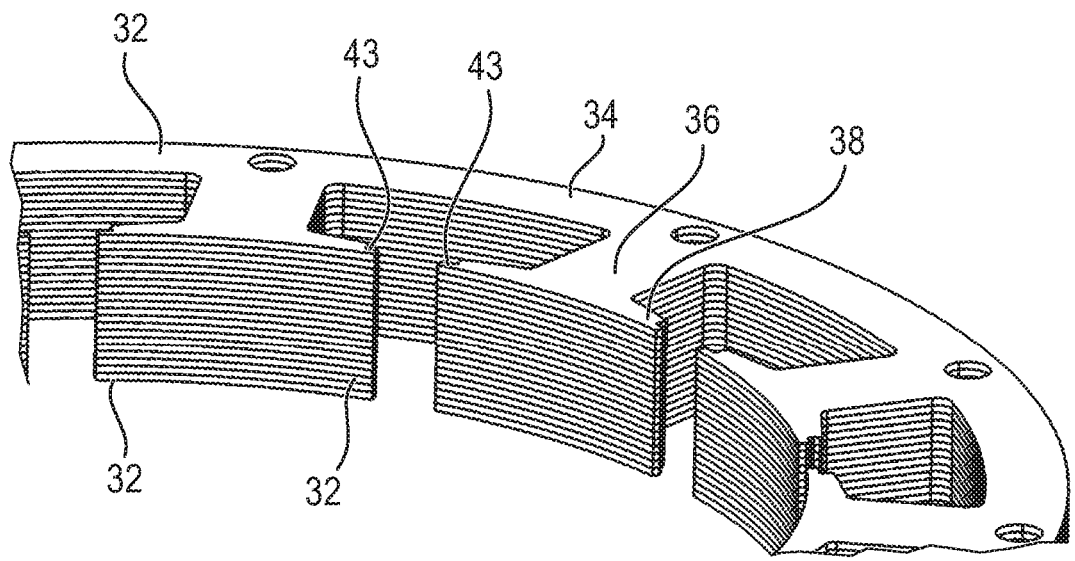

The stator 6 may include a laminated core 22, which is depicted in FIG. 2a and FIG. 2b, as well as a (plastic material coating) plastic material overmolding 23 that may form a portion of the laminated core 22. The stator teeth 20 may not provided with the plastic material overmolding 23 at a side that faces towards the rotor. The extended stator teeth 20 may be configured as pole shoes.

A respective stator groove 24 is formed between adjacent stator teeth 20, in which a coil 25 of a stator winding is accommodated. The stator winding is accordingly supplied with a current by one or more connections 26 that may produce a rotating field. The slot-shaped opening that is formed between the pole lugs 21 and which connects the corresponding stator groove 24 in radial direction R with an air gap that is formed between rotor 4 and stator 6, may be referred to as groove slot 30. In other words, a respective groove slot 30 is formed between the pole lugs 21 that are facing each other.

FIGS. 2a and 2b show the laminated core 22 of stator 6. It is made up of a number of individual sheets 32. Each one of the individual sheets may include a ring-shaped yoke section 34 and along with it metal teeth 36 that are connected in a one-piece or monolithic manner, which protrude radially from the yoke section 34 towards the center, in other words towards the inside of yoke section 34. On the side of the tooth base (side of the open end, inside), the metal sheet teeth 36 are extended in circumferential direction U of stator 6 by forming metal sheet lugs 38, so that the metal sheet teeth 36 are configured in a T-shape. The individual sheets 32 are joined together to form the laminated core 22, wherein stator yoke 19 is formed by the yoke sections 34 of the individual sheets 32, the startor teeth 20 are formed by the metal sheet teeth 36 and the pole lugs 21 by the metal sheet lugs 38.

Figure 3:
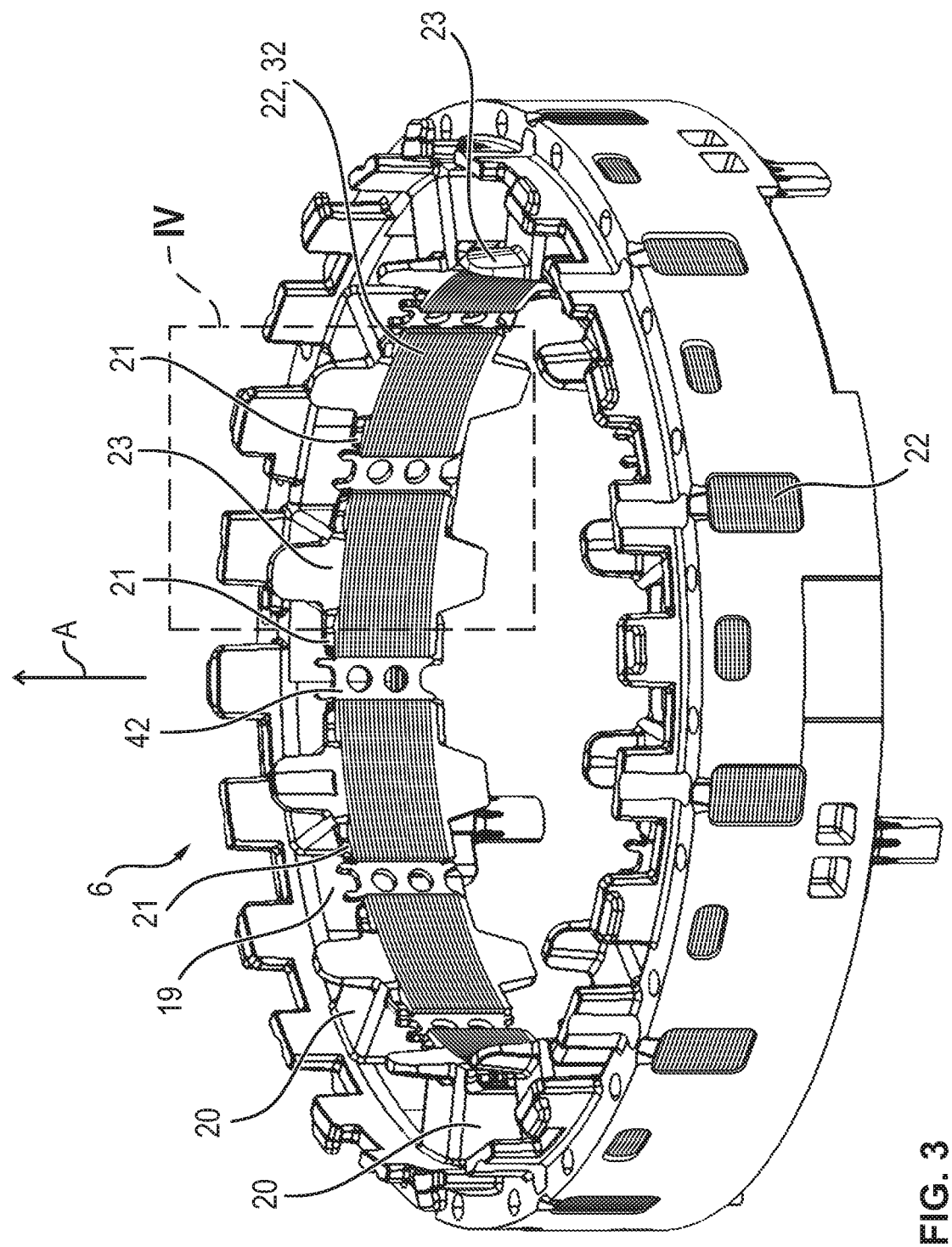
FIG. 3 shows a perspective view, the stator with the laminated core and with a plastic material overmolding, wherein a respective reinforcing element is inserted into groove slots that are formed between the pole lugs in order to reinforce the stator and which are held by the contact shoulders that are formed by the pole lugs.

In FIG. 3, stator 6 is depicted with the laminated core 22 as well as with the plastic material overmolding 23 that is comprising the laminated core 22. A respective reinforcing element 42 may be inserted into each one of the groove slots 30. The pole lugs 21 may form a respective contact shoulder 43 for the reinforcing elements 42. In other words, these pole lugs 21 of adjacent stator teeth 20 that are facing each other are held in radial direction R by the contact shoulder 43, wherein the contact shoulders 43 are formed by the corresponding pole lugs 21. The acoustic characteristics of stator 6 are changed due to the reinforcing elements 42. An oscillation excitation of stator 6 is particularly reduced, a possibly excited oscillation is damped in a comparatively intense manner and/or a (natural) frequency of the oscillation of stator 6 is shifted into a region, in which an oscillation excitation is not to be expected.

Figure 4:
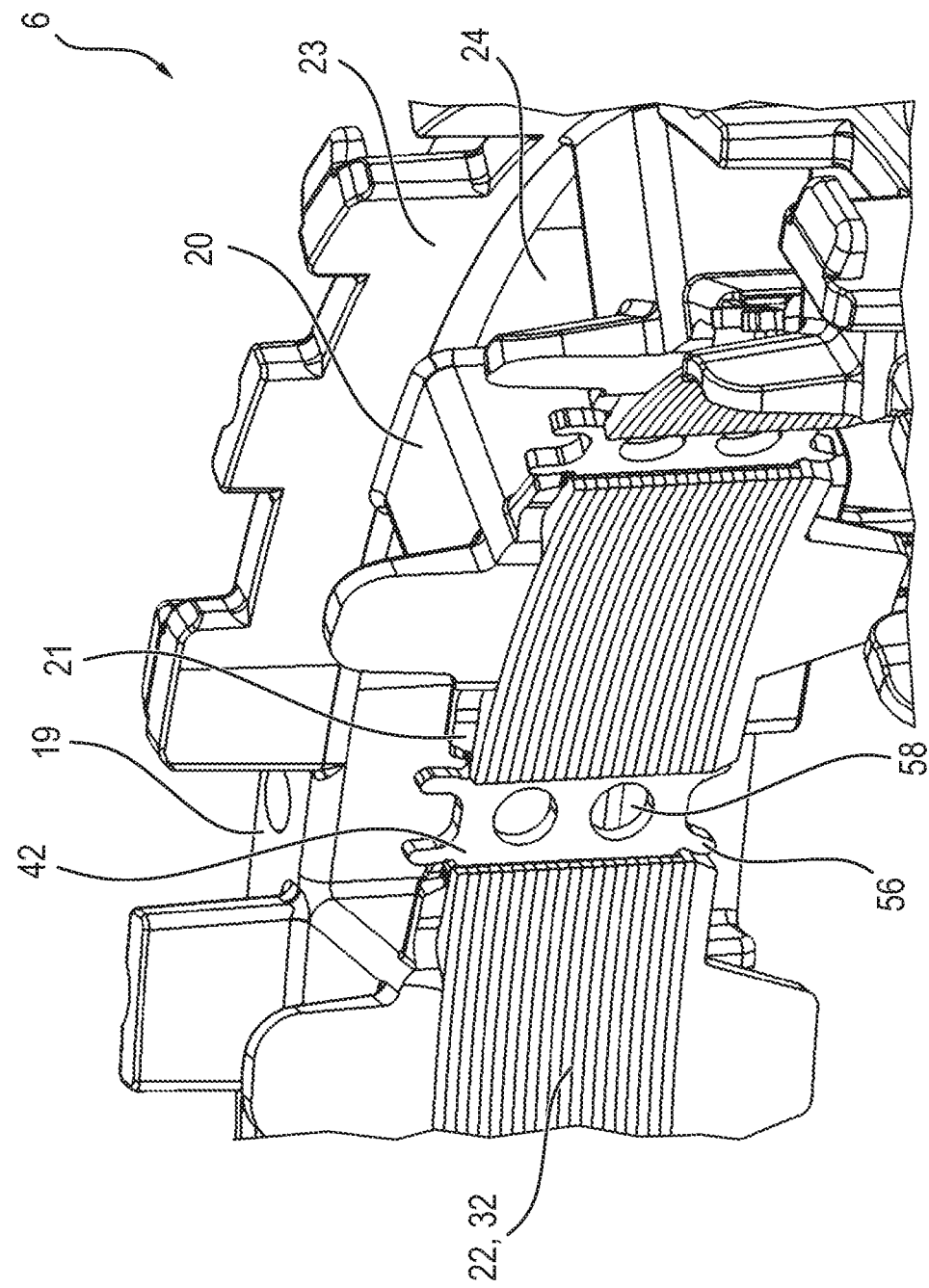
FIG. 4 shows an enlarged scale, the area IV of FIG. 3, wherein the reinforcing elements features a respective joining contour which is designed as a pin at its narrow sides on the end faces, which provides an axial gripping at the rear side together with the pole lugs in the assembled state.
Figure 5:
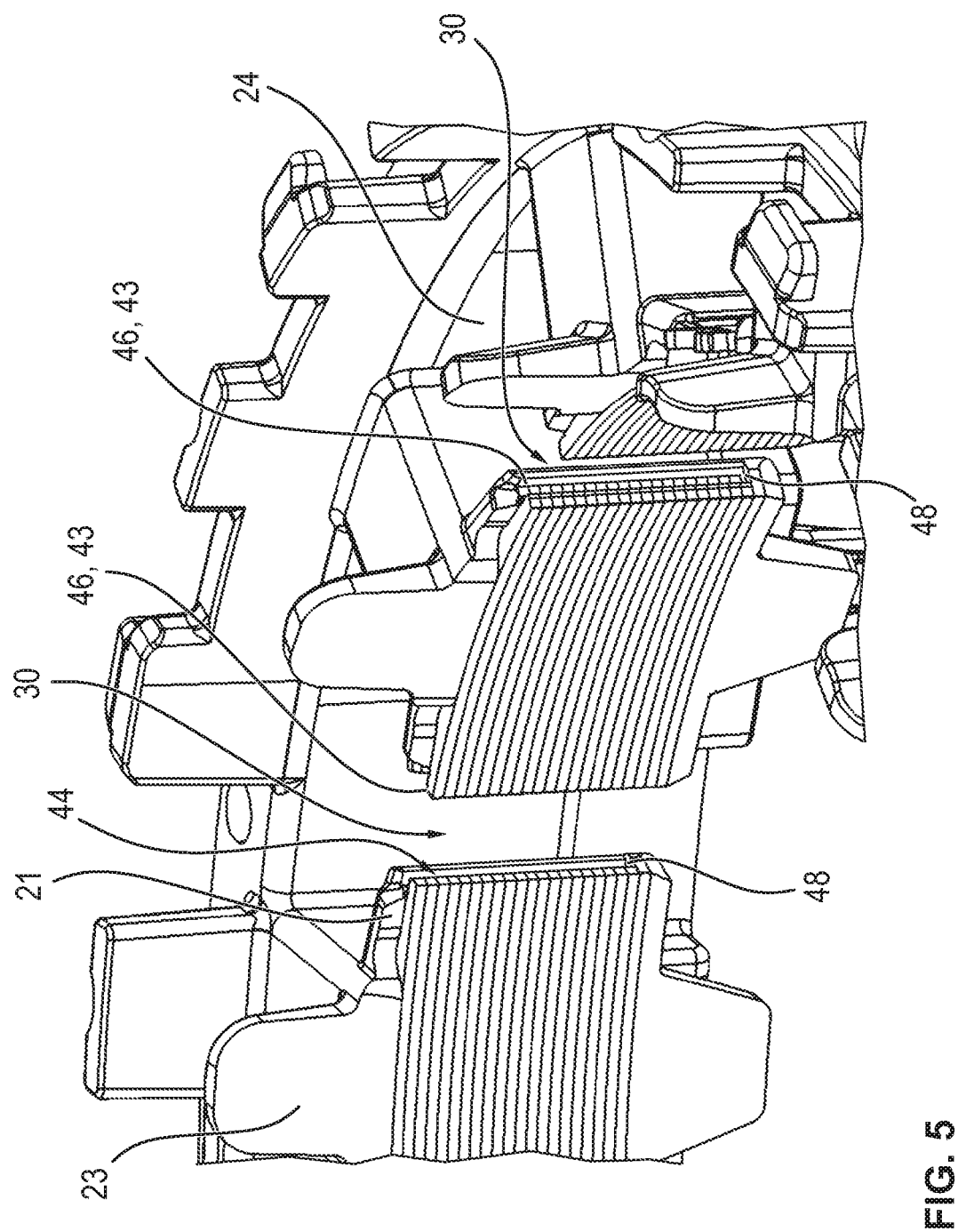
FIG. 5 shows the stator according to FIG. 4 with removed reinforcing elements, wherein the stator features an open groove in circumferential direction in the region of the pole lugs in order to accommodate the reinforcing element.

In accordance with FIG. 3, FIG. 4 and FIG. 5 show in an enlarged section, the adjacent stator teeth 20 with groove slot 30 that is formed between its pole lugs 21. In FIG. 5, the reinforcing element 42 not further depicted, so that the open end with reference to the circumferencial direction U of the pole lugs 21 can be seen more clearly. On the side of its open ends of the pole lugs 21, stator 6 features a groove 44 that is open in circumferential direction U and that extends in axial direction A. The groove slots 46 of groove 44, which extend along the circumferential direction U, may form a respective contact shoulder 43 for the reinforcing element 42. In the course of the assembly of the electric motor 2, the reinforcing elements 42 are each inserted into the corresponding groove 44, so that the reinforcing element 42 is held in the groove slot 30 in radial direction R in a form-fitting manner as a result of the contact shoulders 43 that are formed by the groove walls 46.

To provide the groove 44, the laminated core 22 features a notch on the pole lugs 21 on the side of the open ends with reference to the circumferential direction U on the side that is facing towards stator yoke 19. The side of the notch of the pole lugs 21 that is opposite to stator yoke 19, may form the groove wall 46 that is closer to the air gap and thus the corresponding contact shoulder 43. As it can be seen comparatively clearly in FIG. 5, the plastic material overmolding 23 may form the groove wall 46 which is closer to stator yoke 19, while the groove wall 46 that is formed between stator 6 and rotor 4, which is closer to the air gap, is formed by the laminated core of the corresponding stator tooth 20. Grooves 44 are not continuous in axial direction A. On one of its end sides, the groove features a further groove wall, which is referred to in the following as contact location 48, which is situated in a plane that runs perpendicular to the axial direction A. It forms a form-fitting connection with the reinforcing element 42 against a loosening of the reinforcing element 42 in axial direction from the open-ended face of groove 44 towards the contact location 48.

Figure 6:
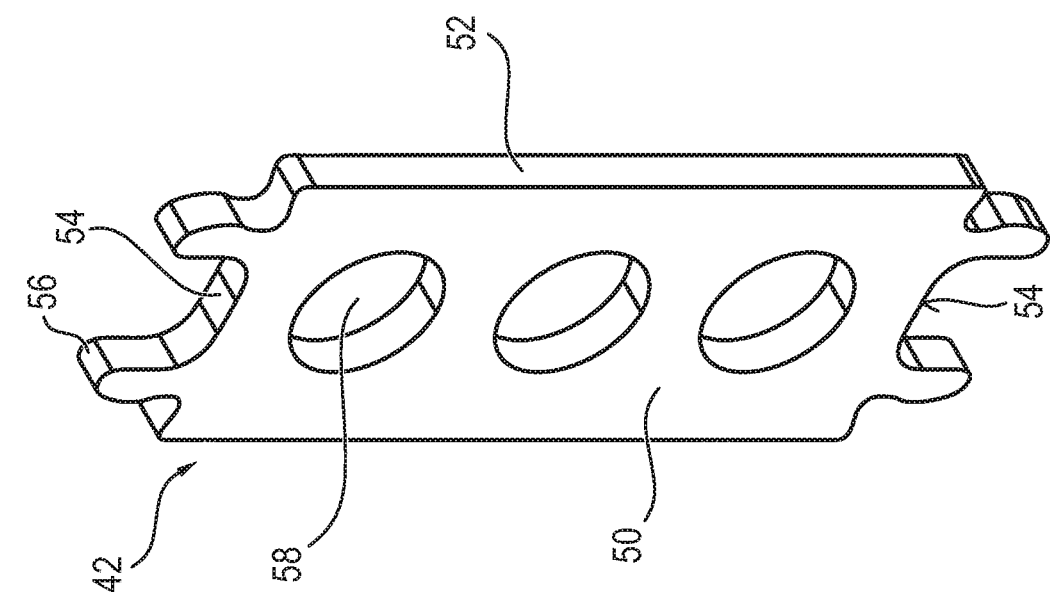
FIG. 6 shows a perspective view, the reinforcing element with passage openings being provided in its broad side, with pins that protrude perpendicular to the narrow side on the end faces and with second narrow sides that are adjacent to this narrow side.

The flat sides of the reinforcing element 42 that are configured as a rectangular plate, which are referred to as broad sides 50, border to the sides of the plate that are referred to as narrow sides 52, 54. The reinforcing element 42 is depicted in an enlarged scale in FIG. 6. In this case, the reinforcing element 42 features an expansion (thickness) that is perpendicular to the broad side 50, which corresponds to the spacing of the groove walls 46. The broad side 50 and the narrow side that is referred to as the "first" narrow side 52 furthermore feature an extension (length), which essentially corresponds to the extension of groove 44 in axial direction A. Both second, narrow sides on the end faces 54, which adjoin the first narrow sides 52 features a respective joining contour 56 which in turn is formed as two pins. The pins reach behind the pole lugs 21 of the corresponding stator teeth 16 in the assembled state, so that a form-fitting connection is provided with reference to the axial direction A.

The reinforcing element 42 is may be formed from a non-magnetic stainless steel. Before a first installation, the pins protrude in perpendicular direction with reference to the narrow sides on the end faces 54. In the course of assembly, the pins are bent in circumferential direction U to produce the form-fitting connection.

In this case, the reinforcing element 42 is designed in a one-piece and symmetrical manner. The reinforcing element 42 is mirror-symmetrical with respect to a plane which runs through the perpendicular bisector of the broad side 50 and parallel to the narrow side on the end face 54, and also mirror-symmetrical with respect to a plane which is spanned by the perpendicular bisector of the broad side 50 and parallel to the first narrow side 52.

The reinforcing element 42 furthermore features passage openings 58, which are designed as bore holes that are going through the broad side 50. In the assembled state, these lead into the corresponding stator groove 44. Eddy current losses may be reduced by the passage openings 58. The passage openings 58 furthermore allow for air circulation, in particular for cooling.

Figure 7B:
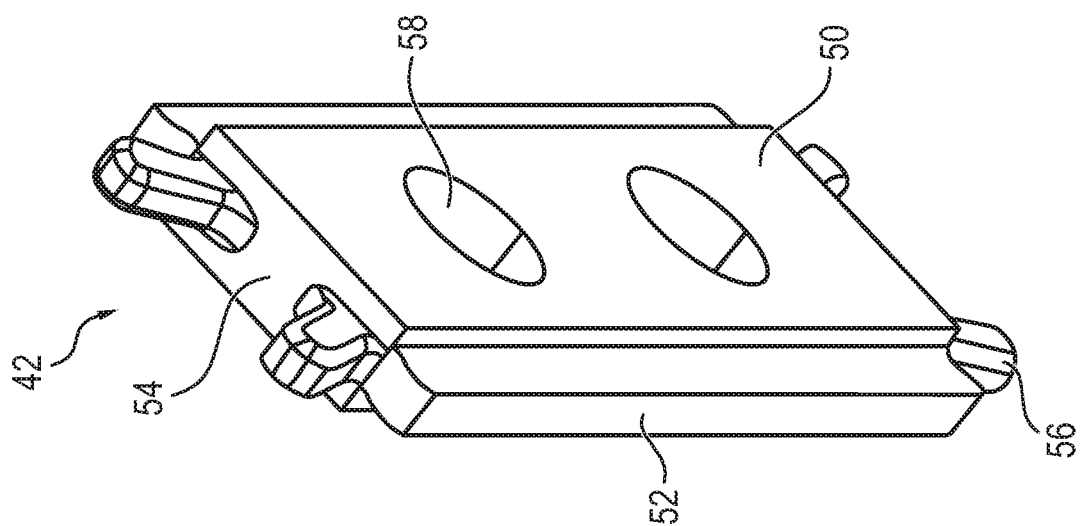
FIGS. 7a and 7b show a top view onto the broad side or in a perspective view, an alternative embodiment of the reinforcing element, with spring-elastic pins at the narrow sides on the end faces, and with a respective joining contour on the second narrow sides.
Figure 7A:
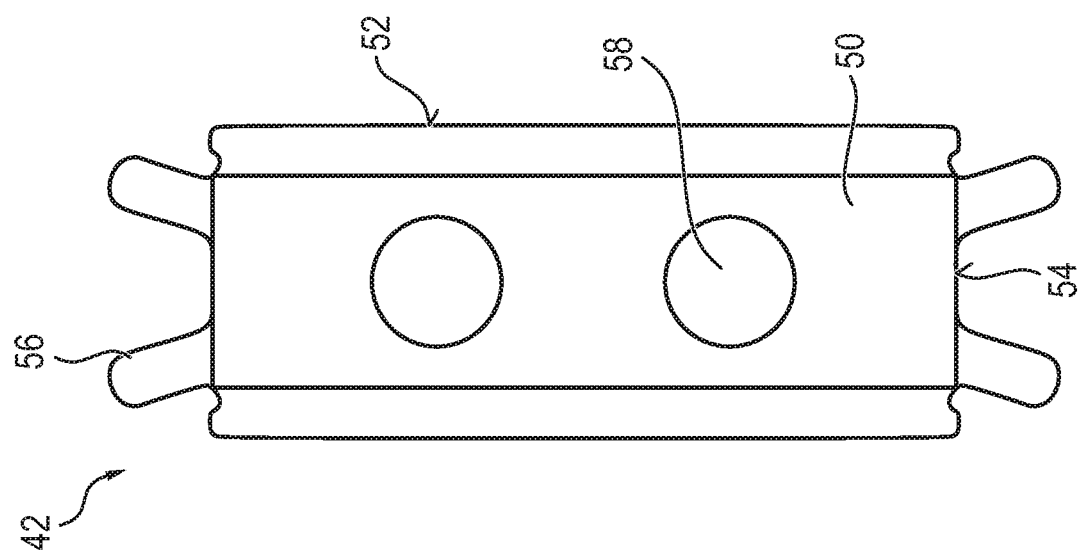

FIGS. 7a and 7b depict an alternative embodiment of the reinforcing element 42. It is made from a plastic material. The joining contours 56 that are formed as two respective pins are inclined away from each other in a plane that is parallel to the broad side 50 on the side of the open end, in particular already before the assembly. Based on the version that is made of a plastic material, the pins are spring-elastically deformable, so that they are temporarily deformed during the assembling procedure and then reach behind the corresponding pole lugs 21 after being assembled due to their inclination.

This plastic material variant of the reinforcing element 42 features a thickness that is greater than the expansion of groove 44 in radial direction R. The reinforcing element 42 and therefore also stator 6 is thus particularly designed in a stiffer way by this measure. Merely in the areas of the first narrow sides 52, the reinforcing element 42 is tapered, so that it features a thickness there, that corresponds to the expansion of groove 44 in radial direction R and that it can be inserted and press-fitted into the groove.

Figure 8:
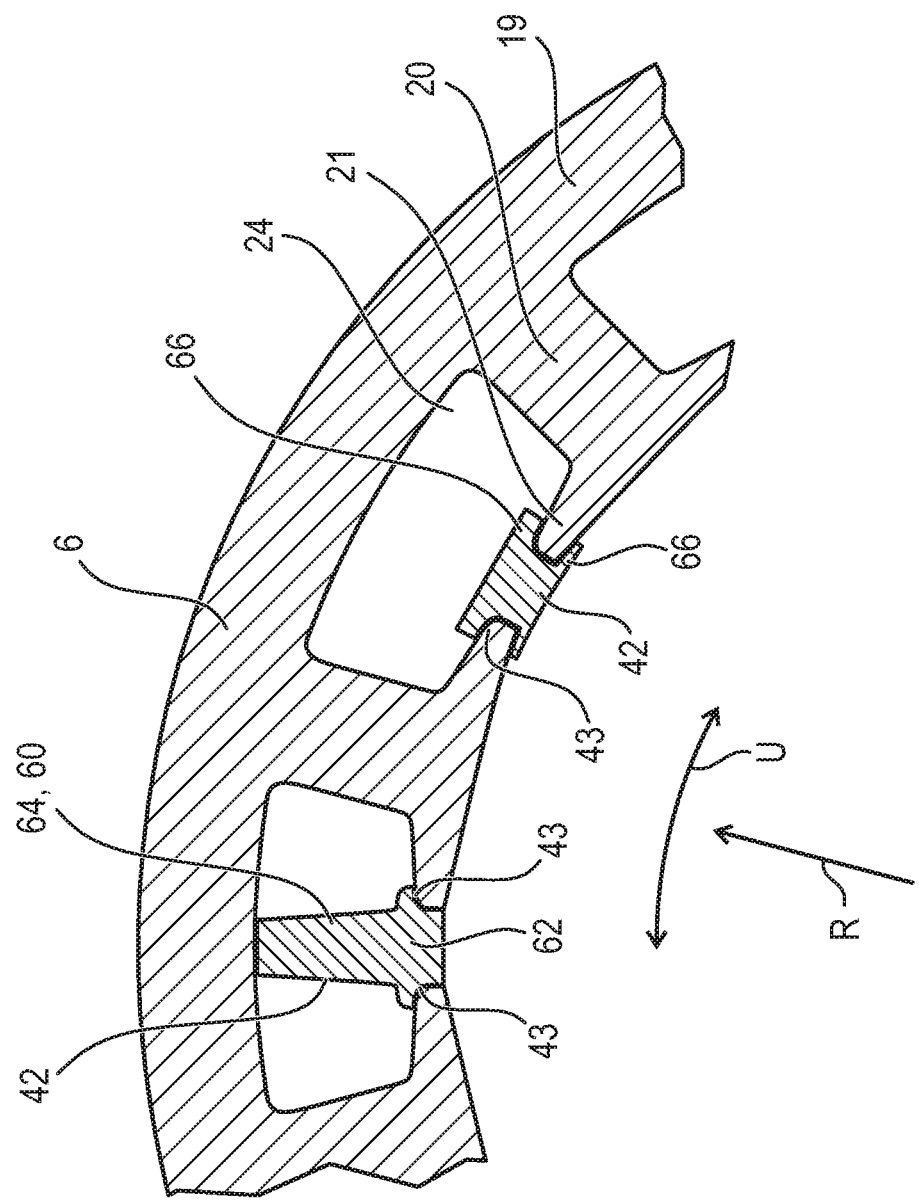
FIG. 8 shows a cross-section through the stator with two further alternative embodiments of the reinforcing element that are inserted into the corresponding groove slots, wherein the pole lugs of the stator teeth function as a respective contact shoulder for the reinforcing elements.

FIG. 8 depicts a top view of a cross-section through stator 6, featuring a sectional plane which runs perpendicular to axial direction A. Two further alternative embodiments of the reinforcing elements 42 are shown here, which are held in radial direction by contact shoulders 43 that are formed by the pole lugs 32. The first one of these two variants may include a tab 60 that extends in radial direction R, which rests against stator yoke 19. In this variant, the reinforcing element 42 thus features a T-shaped cross-section, whose horizontal T-leg 62 rests against the contact shoulders 32 that are formed by the pole lugs 43 and which the vertical T-leg 64 is supported at stator yoke 19. This reinforcing element 42 is press-fitted into the corresponding stator groove 24 and joined there in a form-fit manner, for example, by (ultrasonic) welding.

In the depicted sectional plane, the second alternative variant of the reinforcing element 42 of FIG. 8 features a substantially H-shaped cross-section. The vertical H-legs 66 of the reinforcing element 42 of this variant reach around the contact shoulders 43 of the adjacent stator teeth 20 that are formed by the pole lugs 32. The distance of the vertical H-legs 66 is thereby chosen in such a way, that a press-fitting measure is possible. In other words, the reinforcing element 42 is held in a force-fit manner by press-fitting at the contact shoulders 43. In addition to this, it is joined by an adhesive or alternatively by (ultrasonic) welding in an adhesive bonding manner at the contact shoulders 43. In comparison to the other vertical H-leg 66, the vertical H-leg 66 that projects into the air gap may include a smaller expansion in a direction along the horizontal H-leg, in the assembled state or in radial direction R.

The invention is not limited to the before-mentioned embodiments. On the contrary, other variants of the invention can be derived by a person that is skilled in this field without leaving the subject-matter of the invention. In particular, all individual characteristics that were described in connection with the design examples can also be combined with each other in other ways without leaving the subject-matter of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS

1 Radiator fan
2 Electric Motor
4 Rotor
6 Stator
8 Axis pin
10 Bearing
11 Fan wheel
12 Air guide blade
13 Cap
14 Motor carrier
15 Flange
16 Electronics compartment
17 Motor electronics
18 Electronics compartment cover
19 Stator yoke
20 Stator tooth
21 Pole lug
22 Laminated core
23 Plastic material overmolding
24 Stator groove
25 Coil
26 Connections
30 Groove slot
32 Individual sheet
34 Yoke section
36 Metal sheet tooth
38 Metal sheet lug
42 Reinforcing element
43 Contact shoulder
44 Groove
46 Groove wall
48 Contact location
50 Broad side
52 First narrow side
54 End face sided/second narrow side
56 Joining contour
58 Passage openings
60 Tab
62 Horizontal T-leg
64 Vertical T-leg
66 A Vertical H-leg
A Axial direction D Rotational axis
R Radial direction
U Circumferencial direction

What is claimed is:

1. An electric motor comprising:
   a rotor configured to rotate about a rotational axis extending in an axial direction of the electric motor;
   a stator extending along the rotational axis and including,
      a laminated core formed of a plurality of individual sheets,
      a stator yoke,
      a first tooth and a second tooth, each provided with a shaft extending away from the stator yoke towards the rotational axis to a base, wherein adjacent sides of the base of the first tooth and the base of the second tooth form a groove slot, and wherein the first tooth and second tooth are formed by the plurality of the individual sheets, and the side of the base, the first tooth, and the second tooth form a pole lug; and
      a reinforcement element inserted within the groove slot and having opposing end faces, wherein each of the end faces has at a pair of pins configured to be form-fit to corresponding ones of the pole lugs in the axial direction, wherein the reinforcement element is symmetrical about both its longitudinal and traverse axes such that all of the pins have a same size and shape.

2. The electric motor of claim 1, wherein the first tooth and the second tooth are T-shaped.

3. The electric motor of claim 1, wherein the reinforcing element has a rectangular plate shape.

4. The electric motor of claim 1, wherein the reinforcing element is formed of a non-magnetic material.

5. The electric motor of claim 1, wherein the reinforcing element includes a narrow side disposed in the groove slot.

6. The electric motor of claim 5, wherein the narrow side is tapered and configured to form a press-fit with the groove slot.

7. The electric motor of claim 1, wherein reinforcement element is formed of a plastic material.

8. The electric motor of claim 1, wherein the reinforcing element defines a passage opening that leads into the groove slot.

9. An electric motor comprising:
   a rotor configured to rotate about a rotational axis extending in an axial direction of the electric motor;
   a stator extending along the rotational axis and including,
      a laminated core formed of a plurality of individual sheets,
      a stator yoke,
      a first tooth and a second tooth, each provided with a shaft extending away from the stator yoke towards the rotational axis to a base, wherein adjacent sides of the base of the first tooth and the base of the second tooth form a groove slot, and wherein the first tooth and second tooth are formed by the plurality of the individual sheets, and the side of the base, the first tooth, and the second tooth form a pole lug; and
      a reinforcement element inserted within the groove slot and having opposing end faces, wherein each of the end faces has a pair of pins configured to be form-fit to corresponding ones of the pole lugs in the axial direction, wherein each of the pins extends axially outward from a corresponding one of the end faces.

10. The electric motor of claim 9, wherein the first tooth and the second tooth are T-shaped.

11. The electric motor of claim 9, wherein the reinforcing element has a rectangular plate shape.

12. The electric motor of claim 9, wherein the reinforcing element is formed of a non-magnetic material.

13. The electric motor of claim 9, wherein the reinforcing element includes a narrow side disposed in the groove slot.

14. The electric motor of claim 9, wherein the reinforcing element defines a passage opening that leads into the groove slot.

15. An electric motor comprising:
   a rotor configured to rotate about a rotational axis that extends in an axial direction;
   a stator including:
      a stator yoke,
      a plurality of circumferentially arranged teeth extending from the yoke and cooperating to define a plurality of circumferentially arranged stator grooves configured to receive windings therein, each of the teeth having a base and a shaft extending radially from the base to the yoke, wherein the bases are circumferentially wider than the shafts to have opposing circumferential sides on each of the bases, wherein each of the sides defines a rotor-side groove wall;
      a plastic overmolding covering each of the bases, the plastic overmolding defining yoke-side groove walls on the circumferential sides and opposite the rotor-side groove walls to define axially extending slots on the circumferential sides of the bases; and
      a reinforcement element having opposing narrow sides and inserted between an adjacent pair of first and second ones of the bases with one of the narrow sides disposed in one of the slots of the first base and the other of the narrow sides disposed in the one of the slots of the second base, wherein the reinforcement element has opposing end faces, and each of the end faces has at a pair of pins extending axially therefrom.

16. The electric motor of claim 15, wherein the stator includes a laminated core formed of a plurality of individual sheets.

17. The electric motor of claim 15, wherein the teeth are T-shaped.

18. The electric motor of claim 15, wherein the reinforcing element has a rectangular plate shape.

19. The electric motor of claim 15, wherein the reinforcing element is formed of a non-magnetic material.

20. The electric motor of claim 15, wherein the reinforcing element defines a passage opening that leads into the stator groove.

* * * * *